(12) United States Patent
Ichikawa et al.

(10) Patent No.: US 12,255,993 B2
(45) Date of Patent: Mar. 18, 2025

(54) DATA ACCESS METHOD, DATA STORAGE SYSTEM, SERVER APPARATUS, CLIENT APPARATUS, AND PROGRAM

(71) Applicant: NIPPON TELEGRAPH AND TELEPHONE CORPORATION, Tokyo (JP)

(72) Inventors: Atsunori Ichikawa, Musashino (JP); Koki Hamada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 364 days.

(21) Appl. No.: 17/642,703

(22) PCT Filed: Oct. 8, 2019

(86) PCT No.: PCT/JP2019/039563
§ 371 (c)(1),
(2) Date: Mar. 14, 2022

(87) PCT Pub. No.: WO2021/070234
PCT Pub. Date: Apr. 15, 2021

(65) Prior Publication Data
US 2022/0329419 A1 Oct. 13, 2022

(51) Int. Cl.
*H04L 9/08* (2006.01)
*G06F 16/22* (2019.01)
*G06F 16/28* (2019.01)

(52) U.S. Cl.
CPC ........ *H04L 9/0869* (2013.01); *G06F 16/2255* (2019.01); *G06F 16/288* (2019.01)

(58) Field of Classification Search
CPC ... H04L 9/0869; G06F 16/2255; G06F 16/288
(Continued)

(56) References Cited

U.S. PATENT DOCUMENTS 8,386,529 B2 * 2/2013 Chaudhuri ............ G06F 16/217
707/802
8,635,402 B2 * 1/2014 Torii ................ G06F 16/90339
711/216

(Continued)

FOREIGN PATENT DOCUMENTS

WO   WO 2014/141802 A1 *  9/2014  ............ G06F 17/30
WO   WO 2015/108052 A1 *  7/2015  ............ G06F 17/30

OTHER PUBLICATIONS

Datta, Anindya, et al., "The DataIndex: A structure for smaller faster data warehouses", ACM SIGMIS Database: the Database for Advances in Information Systems, vol. 29, Issue 4, Sep. 1, 1998, pp. 33-44.*

(Continued)

*Primary Examiner* — Robert Stevens
(74) *Attorney, Agent, or Firm* — XSENSUS LLP

(57) ABSTRACT

A search key is generated (S20). A key relationship array is transmitted (S11). If an element matching the key relationship array is present, the found search key is held (S21). A key relationship index is transmitted (S22). A record read out using the key relationship index is transmitted (S12). If the record matches the search key, the found search key is held (S23). The found search key is set for an empty element of the key relationship array and is transmitted (S24). A data array is transmitted (S13). If an element matching the data array is present, the found data is held (S25). A data index is transmitted (S26). A record read out using the data index is transmitted (S14). If the record matches the search key, the found data is held (S27). Desired data is set for an empty element of the data array and is transmitted (S28).

13 Claims, 6 Drawing Sheets

(58) Field of Classification Search
USPC .......................................................... 707/747
See application file for complete search history.

(56) References Cited

U.S. PATENT DOCUMENTS

| | | | | |
|---|---|---|---|---|
| 10,067,967 | B1* | 9/2018 | Bosshart | G06F 16/2255 |
| 10,489,604 | B2* | 11/2019 | Yoshino | G06F 21/6227 |
| 10,833,870 | B2* | 11/2020 | Mullins | H04L 9/14 |
| 2005/0004924 | A1* | 1/2005 | Baldwin | G06F 16/2246 |
| 2007/0112795 | A1* | 5/2007 | Travison | G06F 16/2255 |
| 2010/0046755 | A1* | 2/2010 | Fiske | H04L 9/0822 |
| | | | | 380/278 |
| 2012/0136788 | A1* | 5/2012 | Krishna | G06Q 20/42 |
| | | | | 705/44 |
| 2015/0095664 | A1* | 4/2015 | Furukawa | G06F 21/62 |
| | | | | 713/193 |
| 2017/0288858 | A1* | 10/2017 | Hirano | G06F 16/2255 |
| 2019/0303468 | A1* | 10/2019 | Park | G06F 16/2255 |

OTHER PUBLICATIONS

Tarek, Ahmed, "A New Algorithm for Multiple Key Interpolation Search in Uniform List of Numbers", Recent Advances in Applied Mathematics and Computational and Information Sciences, vol. 2, ISSN: 1790-5117, ISBN: 978-960-474-071-0, Apr. 2009, pp. 321-327.*

Wu, Xingbo, et al., "Wormhole: A Fast Ordered Index for In-memory Data Management", EuroSys '19, Dresden, Germany, Mar. 25-28, 2019, Article 18, pp. 1-16.*

Zuo, Pengfei, et al., "Level Hashing: A High-performance and Flexible-resizing Persistent Hashing Index Structure", ACM Transactions on Storage (TOS), vol. 15, No. 2, Article 13, Jun. 2019, pp. 13:1-13:30.*

Goldreich et al."Software Protection and Simulation on Oblivious RAMs", Journal of the ACM, vol. 43, No. 3, May 1996, pp. 431-473.

* cited by examiner

DATA ACCESS METHOD, DATA STORAGE SYSTEM, SERVER APPARATUS, CLIENT APPARATUS, AND PROGRAM

CROSS-REFERENCE TO RELATED APPLICATION

The present application is based on PCT filing PCT/JP2019/039563, filed Oct. 8, 2019, the entire contents of which are incorporated herein by reference.

TECHNICAL FIELD

The present invention relates to cryptographic application technology, and more particularly to technology for accessing encrypted data stored in an external storage while concealing the content of data and the content of data access.

BACKGROUND ART

In recent years, there has been increasing demand for entrusting data to external storage, such as cloud services. Such services are useful in that a large volume of data can be stored and accessed even if a user (client) does not have a sufficient local storage area. Meanwhile, protection of privacy of the client who uses an external storage requires "confidentiality of data content" and "confidentiality of the content of data access (search)". The data content itself relates to the client's privacy and needs to be stored in a state of being concealed in some way, such as encryption. Further, considering that the data content can be inferred from keywords or the like used when data is searched, it is desirable to be capable of accessing data while concealing the data itself and search keys. In addition, even when data and search keys are concealed, if a bias in the physical memory address referenced in the external storage can be identified, it is conceivable that information will be leaked by analyzing the bias in the access tendency (hereinafter called an "access pattern").

To solve these problems, a technology for accessing data while concealing data, search keys, and access patterns is disclosed in NPL 1.

CITATION LIST

Non Patent Literature

[NPL 1] O. Goldreich and R. Ostrovsky, "Software protection and simulation on oblivious RAMs," Journal of the ACM, vol. 43(3), pp. 431-473, May 1996.

SUMMARY OF THE INVENTION

Technical Problem

In the conventional technology described in NPL 1, a search key needs to be independent, i.e., one search key needs to correspond to one piece of data in order to access data while concealing data, search keys, and access patterns. However, considering the usefulness as data storage, it is desirable that a plurality of search keys can be set for one pieces of data.

In view of the foregoing technical problems, an object of the present invention is to enable data access using any number of search keys while concealing all of data, search keys, and access patterns.

Means for Solving the Problem

To solve the foregoing problems, a data access method according to an aspect of the invention is a data access method to be executed by a data storage system that includes a server apparatus and a client apparatus, wherein k and m are integers of 2 or more, and i is each of the integers that are 2 or more and m or less, a data array and a data table are stored in a data storage unit of the server apparatus, the data array being for storing k data elements each consisting of data and a first key associated with the data, and the data table including at least one hash table for storing k or more data records each consisting of a data index that is randomly generated based on the first key, the first key, and the data, and m−1 key relationship arrays and m−1 key relationship tables are stored in a key relationship storage unit of the server apparatus, each of the m−1 key relationship arrays being for storing k key relationship elements each consisting of the first key and another key associated with the data, and each of the m−1 key relationship tables including at least one hash table for storing k or more key relationship records each consisting of a key relationship index that is randomly generated based on the other key, the first key, and the other key, the method including: generating m search keys with use of a search key generation unit of the client apparatus; transmitting an i-th key relationship array to the client apparatus with use of a key relationship array transmission unit of the server apparatus; if a key relationship element that matches an i-th search key is present in the i-th key relationship array received from the server apparatus, holding the first key of this key relationship element as a found search key with use of a key relationship array search unit of the client apparatus; transmitting a key relationship index generated based on the i-th search key to the server apparatus with use of a key relationship index generation unit of the client apparatus; transmitting, to the client apparatus, a key relationship record that is read out from the key relationship table using the key relationship index received from the client apparatus with use of a key relationship table search unit of the server apparatus; if the key relationship record received from the server apparatus matches the i-th search key, holding the first key of this key relationship record as the found search key with use of a key relationship record reference unit of the client apparatus; transmitting, to the server apparatus, a key relationship array in which a key relationship element consisting of the found search key and the i-th search key is set for an empty element of the i-th key relationship array with use of a key relationship array return unit of the client apparatus; transmitting the data array to the client apparatus with use of a data array transmission unit of the server apparatus; if a data element that matches the found search key or the first search key is present in the data array received from the server apparatus, holding data of this data element as found data with use of a data array search unit of the client apparatus; generating a data index based on the found search key if the found search key is held, or generating a data index based on the first search key if the found search key is not held, and transmitting the generated data index to the server apparatus with use of a data index generation unit of the client apparatus; transmitting, to the client apparatus, a data record that is read out from the data table using the data index received from the client apparatus with use of a data table search unit of the server apparatus; if the data record received from the server apparatus matches the found search key or the first search key, holding data of this data record as the found data with use of a data record reference unit of the client apparatus; and setting a data element consisting of desired data and the found search key for an empty element of the data array if the found data and the found search key are held, or, if not, setting a data element consisting of desired data and the first search key for an empty element of the data array, and transmitting an updated data array to the server apparatus with use of a data array return unit of the client apparatus.

Effects of the Invention

According to the invention, data can be accessed using any number of search keys while concealing all of data, search keys, and access patterns by constructing a system such that a plurality of search keys ultimately reference one pieces of data.

DESCRIPTION OF EMBODIMENTS

Figure 1:
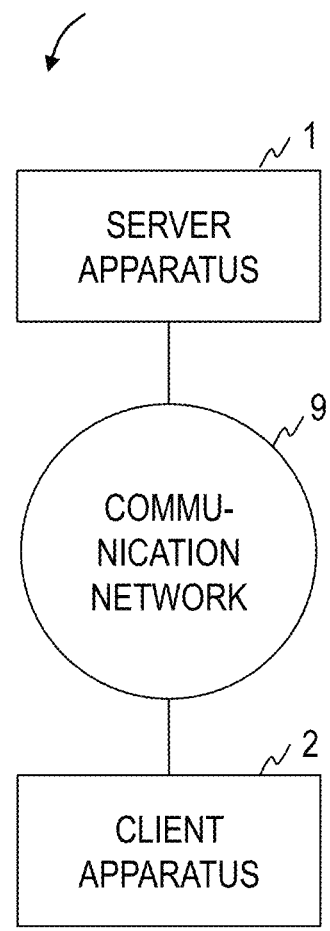
FIG. 1 is a diagram showing an example of a functional configuration of a data storage system.

Hereinafter, embodiments of the invention will be described in detail. Note that constituent units with like functions are assigned like reference numerals in the drawings, and redundant description is omitted.

First Embodiment

An example configuration of a data storage system according to a first embodiment will be described with reference to FIG. 1. A data storage system 100 includes a server apparatus 1 and a client apparatus 2, for example. In the present embodiment, the server apparatus 1 and the client apparatus 2 are connected to a communication network 9. The communication network 9 is a line-switched or packet-switched communication network configured such that connected apparatuses can communicate with each other, and may be, for example, the Internet, a LAN (Local Area Network), a WAN (Wide Area Network), or the like.

Figure 2:
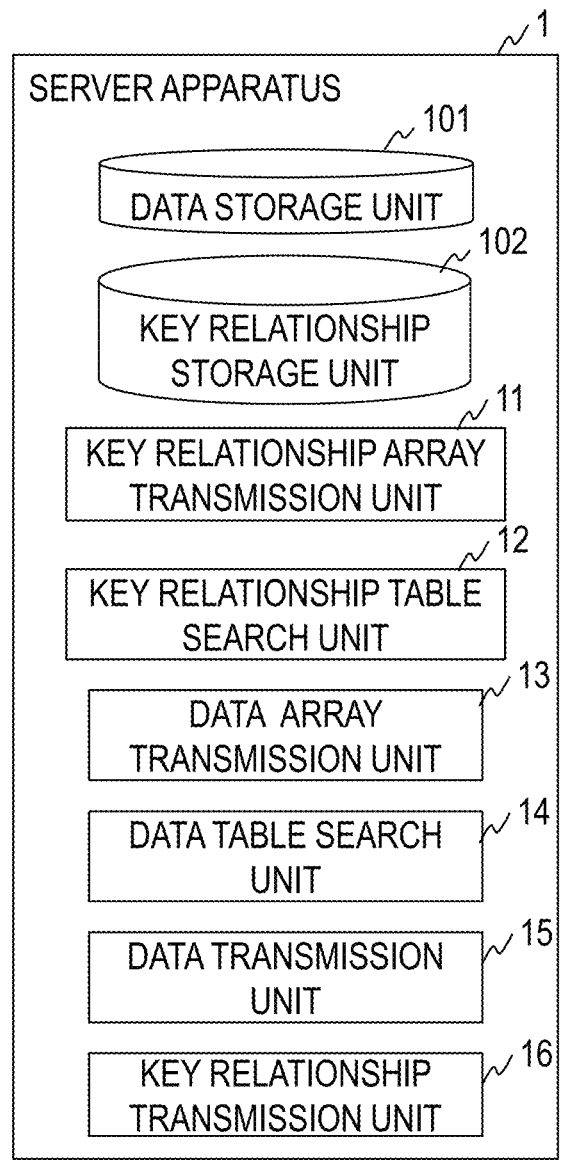
FIG. 2 is a diagram showing a functional configuration of a server apparatus.
Figure 3:
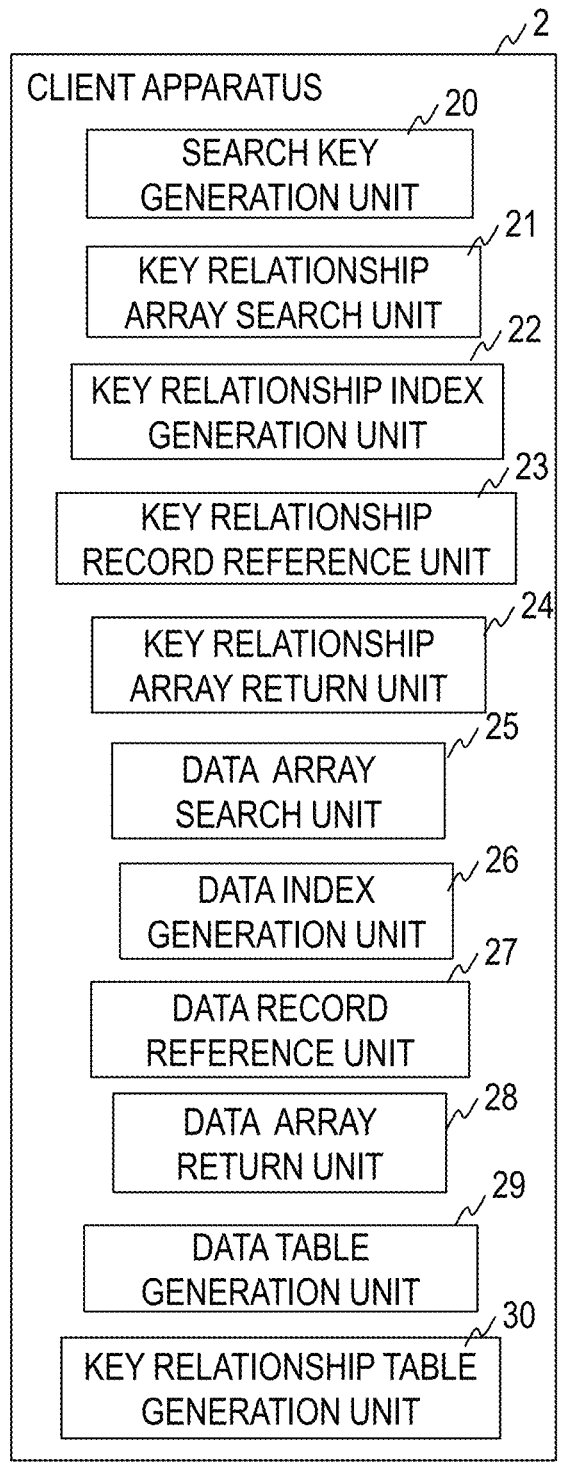
FIG. 3 is a diagram showing a functional configuration of a client apparatus.

The server apparatus 1 included in the data storage system 100 includes, for example, a data storage unit 101, a key relationship storage unit 102, a key relationship array transmission unit 11, a key relationship table search unit 12, a data array transmission unit 13, a data table search unit 14, a data transmission unit 15, and a key relationship transmission unit 16, as shown in FIG. 2. The client apparatus 2 included in the data storage system 100 includes, for example, a search key generation unit 20, a key relationship array search unit 21, a key relationship index generation unit 22, a key relationship record reference unit 23, a key relationship array return unit 24, a data array search unit 25, a data index generation unit 26, a data record reference unit 27, a data array return unit 28, a data table generation unit 29, and a key relationship table generation unit 30, as shown in FIG. 3. The data access method of the first embodiment is realized as a result of the server apparatus 1 and the client apparatus 2 performing processing in the steps shown in FIGS. 4 and 5 in cooperation with each other.

The server apparatus 1 and the client apparatus 2 are special apparatuses that are configured by loading a special program to a known or dedicated computer that has a CPU (Central Processing Unit), a main storage device (RAM: Random Access Memory), and so on, for example. The server apparatus 1 and the client apparatus 2 execute processing under the control of the central processing unit, for example. Data input to the server apparatus 1 and the client apparatus 2 and data obtained through processing is stored in the main storage device, for example, and the data stored in the main storage device is loaded to the central processing unit as necessary and used in another processing. Each processing unit of the server apparatus 1 and the client apparatus 2 may be constituted, at least partially, by hardware such as an integrated circuit. Each storage unit included in the server apparatus 1 may be constituted by, for example, a main storage device such as a RAM (Random Access Memory), an auxiliary storage device constituted by a semiconductor memory element such as a hard disk, an optical disk, or a flash memory, or middleware such as a relational database or a key-value store. The server apparatus 1 is, specifically, a server computer of tower type or rack mount type. The client apparatus 2 is, specifically, a personal computer of desktop type or laptop type, a smartphone, a tablet terminal, or the like.

A processing procedure for reading out data in the data access method executed by the data storage system 100 of the first embodiment will be described with reference to FIG. 4.

In the following description, m search keys $v_1, v_2, \ldots v_n$ are associated with each piece of data D. Here, m is a predetermined integer of 2 or more. Note that data stored in the server apparatus 1 and data transmitted and received between the server apparatus 1 and the client apparatus 2 are all encrypted with private keys of the client apparatus 2.

A data array, with which k elements can be stored, and a data table, in which hash tables, each of which can store k or more records, have a hierarchical structure and a total of $kd^T$ records can be stored, are stored in the data storage unit 101 of the server apparatus 1. Here, k and d are predetermined integers of 2 or more, and T is the number of levels of the hierarchy. The data table is configured to have d−1 hash tables for storing k records at a first level, d−1 hash tables for storing kd records at a second level, d−1 hash tables for storing $kd^2$ records at a third level . . . , and d−1 hash tables for storing $kd^{T-1}$ records at a T-th level. That is to say, d−1 hash tables are configured at each level, and the number of records that can be stored in each hash table increases by d times as the hierarchy deepens.

Each hash table is an array in which a predetermined number of records can be stored while being randomly arranged, and the records can be referenced using one index unique to each record. That is to say, each hash table is an array in which a record (u, d) consisting of an index u and a data body d is stored at a random position (memory address) within the array, and the position at which the record (u, d) is stored can be uniquely identified using the index u.

Each element of the data array stores an element $(v_1, D)$ (hereinafter also referred to as a "data element") consisting of a first key $v_1$ and a data body D. Each hash table in the data table has a unique identifier e. Each record of a hash table stores a record $(r_1^e, v_1, D)$ (hereinafter also referred to as a "data record") in which an index $r_1^e$ (hereinafter also referred to as a "data index") that is randomly generated based on the first key $v_1$ and the identifier e of the hash table is set for the pair of the first key $v_1$ and the data body D. The index is generated using a pseudo-random function $F_n$. That is to say, when a hash table is generated, $r_1^e \leftarrow F_e(v_1, e)$ is calculated to generate the index $r_1^e$.

In the key relationship storage unit 102 of the server apparatus 1, m−1 key relationship arrays, each of which can store k elements, and m−1 key relationship tables in which hash tables, each of which can store k or more records, have a hierarchical structure and a total of $kd^T$ records can be stored. Here, m is the maximum number of search keys. The key relationship table is configured to have d−1 hash tables for storing k records at a first level, d−1 hash tables for storing kd records at a second level, d−1 hash tables for storing $kd^2$ records at a third level . . . , and d−1 hash tables for storing $kd^{T-1}$ records at a T-th level. That is to say, the key relationship storage unit 102 stores m−1 sets of arrays and tables that have the same structure as the array and the tables stored in the data storage unit 101.

Each element of the key relationship array stores an element ($v_1$, $v_i$) (hereinafter also referred to as a "key relationship element") consisting of the first key $v_1$ and an i-th key $v_i$. Here, i is each of the integers that are 2 or more and m or less. Each hash table in the key relationship table has a unique identifier e. Each record of a hash table stores a record ($r_1^e$, $v_1$, $v_i$) (hereinafter also referred to as a "key relationship record") in which an index $r_i^3$ (hereinafter also referred to as a "key relationship index") that is randomly generated based on the i-th key $v_i$ and the identifier e of the hash table is set for the pair of the first key $v_1$ and the i-th key $v_i$. The index is generated using the pseudo-random function $F_e$. That is to say, when a hash table is generated, $r_1^e \leftarrow F_e(v_i, e)$ is calculated to generate the index $r_i^e$.

In step S20, the search key generation unit 20 of the client apparatus 2 generates m search keys ($v_1^q$, $v_2^q$, . . . , $v_m^q$). Here, the search key generation unit 20 may set any number of search keys, of m search keys, as dummies. That is to say, a search can be performed by setting all m search keys, and can also be performed by setting one or more and m−1 or less search keys. The search key generation unit 20 transmits a signal indicating a request for data access to the server apparatus 1.

Processing in steps S11 to S24 is repeatedly executed for a second search key $v_2^q$ to an m-th search key $v_m^q$. Processing for an i-th search key $v_i^q$ will be described below. Note that i is an integer of 2 or more and m or less.

In step S11, the key relationship array transmission unit 11 of the server apparatus 1 reads out an i-th key relationship array from the key relationship storage unit 102 and transmits the read i-th key relationship array to the client apparatus 2.

In step S21, the key relationship array search unit 21 of the client apparatus 2 determines whether or not an element that matches the i-th search key $v_i^q$ is present in the i-th key relationship array received by the server apparatus 1. If an element that matches the search key $v_i^q$ is present, the key $v_1$ of this element is held as a found search key $\varphi = v_1$.

In step S22, if the found search key $\varphi$ has been set, the key relationship index generation unit 22 of the client apparatus 2 sets dummy data for x, and if the found search key $\varphi$ has not been set, the key relationship index generation unit 22 sets the search key $v_i^q$ for x and generates an index $r_1^e \leftarrow F_x$ (x, e) using the pseudo-random function $F_x$. Dummy data has a value that cannot be set as a search key and differs for each data access. For example, a value obtained by connecting a predetermined fixed value (e.g., "dummy") to the number of times of data access may be set as dummy data. The key relationship index generation unit 22 transmits the generated index $r_i^e$ to the server apparatus 1.

In step S12, the key relationship table search unit 12 of the server apparatus 1 references the tables using the index $r_i^e$ received from the client apparatus 2 in the order from smaller hash tables (i.e., at shallower levels) in the key relationship table stored in the key relationship storage unit 102. The key relationship table search unit 12 transmits the record ($r_i^e$, $v_1$, $v_i$) read out from the key relationship table to the client apparatus 2.

In step S23, if the record ($r_i^e$, $v_1$, $v_i$) received from the server apparatus 1 matches the i-th search key $v_i^q$, the key relationship record reference unit 23 of the client apparatus 2 holds the key $v_1$ of this record as a found search key $\varphi = v_1$. If the found search key p has been set, the key relationship record reference unit 23 transmits, to the server apparatus 1, a record in which the key $v_i$ of the received record is rewritten as dummy data. If the found search key T has not been set, the key relationship record reference unit 23 transmits the received record as-is to the server apparatus 1.

In step 324, if the found search key $\varphi$ has been set, the key relationship array return unit 24 of the client apparatus 2 sets a pair ($v_1$, $v_i^q$) of the found search key $\varphi = v_1$ and the i-th search key $v_i^q$ at an empty position (i.e., a position at which an empty element is stored) in the i-th key relationship array received from the server apparatus 1. If the found search key $\varphi$ has not been set, the key relationship array return unit 24 sets a pair of dummy data and the i-th search key $v_i^q$ at an empty position in the i-th key relationship array received from the server apparatus 1. The key relationship array return unit 24 transmits the updated i-th key relationship array to the server apparatus 1.

In step S13, the data array transmission unit 13 of the server apparatus 1 reads out a data array from the data storage unit 101 and transmits the read data array to the client apparatus 2.

In step S25, if the found search key 9 has been set, the data array search unit 25 of the client apparatus 2 determines whether or not an element that matches the found search key $\varphi$ is present in the data array received from the server apparatus 1. If an element that matches the found search key $\varphi$ is present, data D of this element is held as found data $\pi = D$. If the found search key $\varphi$ has not been set, the data array search unit 25 determines whether or not an element that matches a first search key $v_1^q$ is present in the data array received from the server apparatus 1. If an element that matches the first search key $v_1^q$ is present, data D of this element is held as found data $\pi = D$.

In step S26, if the found data $\pi$ has been set, the data index generation unit 26 of the client apparatus 2 sets dummy data for x. If the found data $\pi$ has not been set, and the found search key m has been set, the data index generation unit 26 sets the found search key $\varphi = v_1$ for x. If the found data $\pi$ has not been set, and the found search key $\varphi$ has not been set either, the data index generation unit 26 sets the first search key $v_1^q$ for x, and generates an index $r_1^e \leftarrow F_x$ (x, e) using the pseudo-random function $F_x$. The data index generation unit 26 transmits the generated index $r_1^e$ to the server apparatus 1.

In step S14, the data table search unit 14 of the server apparatus 1 references tables using the index $r_1^e$ received from the client apparatus 2 in the order from smaller hash tables (i.e., at shallower levels) in the data table stored in the data storage unit 101. The data table search unit 14 transmits the record ($r_1^e$, $v_1$, D) read out from the data table to the client apparatus 2.

In step S27, if the found search key $\varphi$ has been set, and the record $(r_1^e, v_1, D)$ received from the server apparatus 1 matches the found search key $\varphi$, the data record reference unit 27 of the client apparatus 2 holds data D of this record as found data $\pi$=D. If the found search key $\varphi$ has not been set, and the record $(r_1^e, v_1, D)$ received from the server apparatus 1 matches the first search key $v_1^q$, the data record reference unit 27 holds data D of this record as found data $\pi$=D.

In step S28, if the found data $\pi$ and the found search key $\varphi$ have been set, the data array return unit 28 of the client apparatus 2 sets a pair $(v_1, D)$ of the found data $\pi$=D and the found search key $\varphi=v_1$ at an empty position in the data array received from the server apparatus 1. If the found data $\pi$ has been set, and the found search key $\varphi$ has not been set, the data array return unit 28 sets a pair $(v_1^q, D)$ of the found data $\pi$=D and the first search key $v_1^q$ at an empty position in the data array received from the server apparatus 1. If the found data $\pi$ has not been set, the data array return unit 28 sets a pair of dummy data and the first search key $v_1^q$ at an empty position in the data array received in the server apparatus 1. At this time, the data array return unit 28 may rewrite data D to be set with desired data. This corresponds to updating data that matches a desired search key in the data stored in the server apparatus 1 to desired data. The data array return unit 28 may also set dummy data as desired data. This corresponds to writing new data for which a new search key has been set when data that matches a desired search key does not exists in the data stored in the server apparatus 1. The data array return unit 28 transmits the updated data array to the server apparatus 1.

The server apparatus 1 updates the data array stored in the data storage unit 101 with the data array received from the client apparatus 2.

A processing procedure for generating a hash table in the data access method executed by the data storage system 100 of the first embodiment will be described with reference to FIG. 5.

Figure 4:
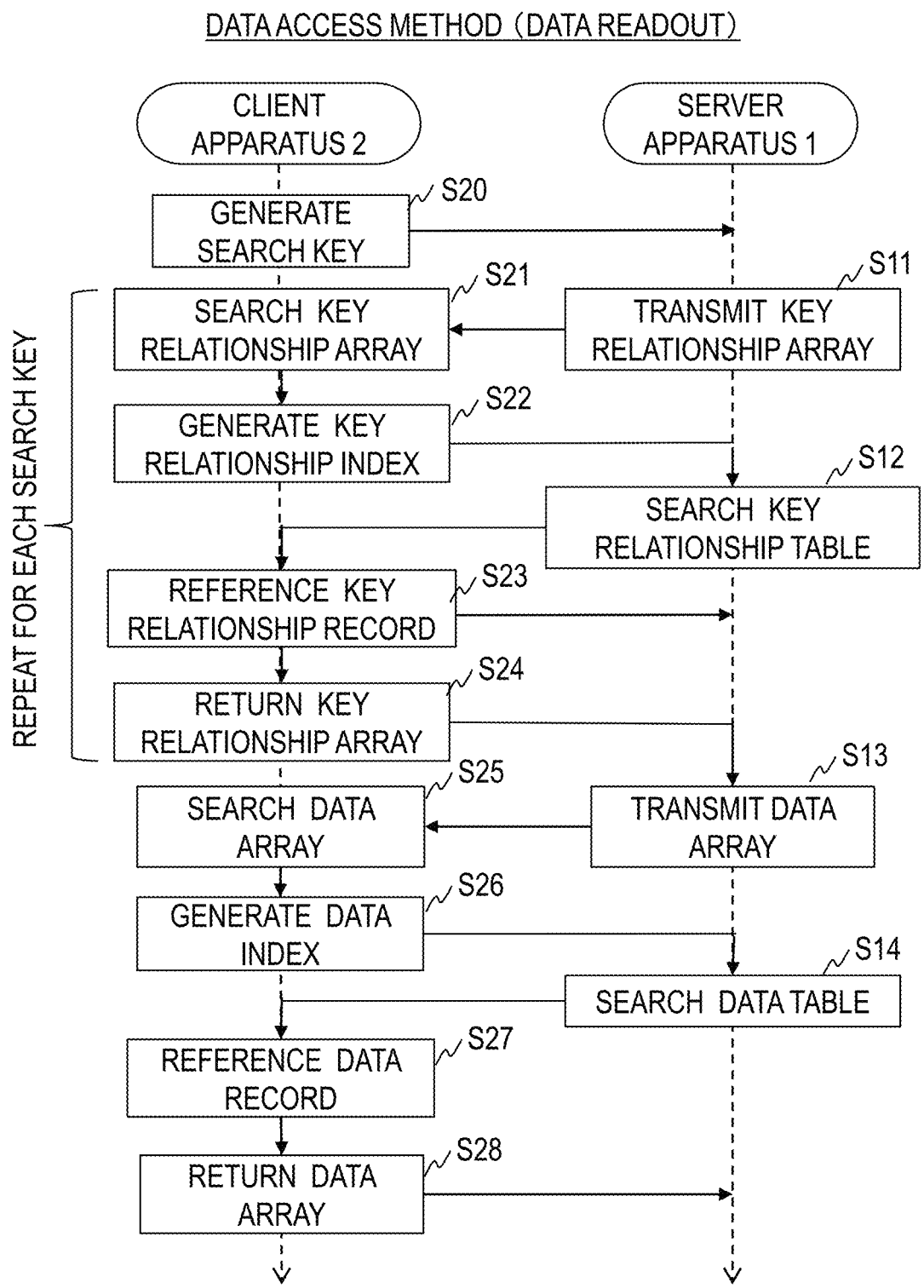
FIG. 4 is a diagram showing an example of a processing procedure for reading out data.
Figure 5:
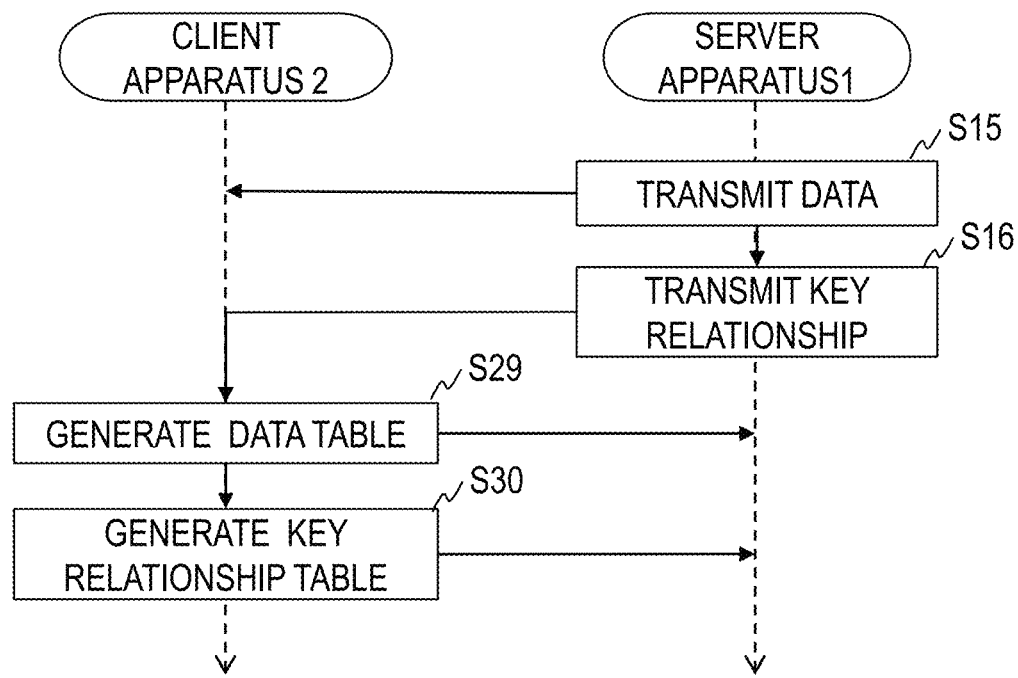
FIG. 5 is a diagram showing an example of a processing procedure for generating a hash table.

The steps shown in FIG. 5 are executed when the number of times that the steps shown in FIG. 4 are executed is a multiple of k. According to the above-described processing procedure for reading out data, one element is added to a key relationship array and a data array as a result of data being accessed once. Thus, when the number of times of data access is a multiple of k, k elements are stored in the key relationship array and the data array.

Note that it is assumed below that all the hash tables at up to t-th levels are filled. That is to say, it is assumed that d−1 hash tables for storing k elements at the first level, d−1 hash tables for storing kd elements at the second level, . . . and d−1 hash tables for storing $kd^{t-1}$ elements at the t-th level are filled, and a total of $kd^t$ elements are stored in the data table and the key relationship table. Meanwhile, hash tables at a (t+1)-th level are vacant, i.e., less than d−1 hash tables are filled.

In step S15, the data transmission unit 15 of the server apparatus 1 reads out elements $(v_1, D)$ each consisting of the first key $v_1$ and the data D stored in the data array or the hash tables at up to the t-th level in the data table stored in the data storage unit 101, and transmits all the elements $(v_1, D)$ to the client apparatus 2. The data transmission unit 15 may read out and transmit the elements one by one, or may collectively read out and transmit all the elements.

In step S16, the key relationship transmission unit 16 of the server apparatus 1 reads out elements $(v_1, v_i)$ each consisting of the first key $v_1$ and the i-th key $v_i$ stored in the key relationship array or the hash tables at up to the t-th level in the key relationship table stored in the key relationship storage unit 102, and transmits all the elements $(v_1, v_i)$ to the client apparatus 2. The key relationship transmission unit 16 may also read out and transmit the elements one by one, or may collectively read out and transmit all the elements, similarly to the data transmission unit 15.

In step S29, the data table generation unit 29 of the client apparatus 2 regenerates a data table in which a new unique identifier e' is set for each hash table included in the data table. First, the data table generation unit 29 regenerates an index $r_1^{e'} \leftarrow F_x(v_1, e')$ based on the first key $v_1$ and the new identifier e' for all the first keys $v_1$ stored in the data arrays or the data table stored in the data storage unit 101. Next, the data table generation unit 29 regenerates a data table that stores all records $(r_1^{e'}, v_1, D)$ each consisting of the regenerated index $r_1^{e'}$, the first key $v_1$, and the data D.

In step S30, the key relationship table generation unit 30 of the client apparatus 2 regenerates a key relationship table in which the new unique identifier e' is set for each hash table included in the key relationship table. First, the key relationship table generation unit 30 regenerates an index $r_i^{e'} \leftarrow F_x(v_i, e')$ based on the i-th key $v_i$ and the new identifier e' for all of the i-th keys $v_i$ stored in the i-th key relationship array or the i-th key relationship table stored in the key relationship storage unit 102. Next, the key relationship table generation unit 30 regenerates the i-th key relationship table that stores all records $(r_i^{e'}, v_1, v_i)$ each consisting of the regenerated index $r_i^{e'}$, the first key $v_1$, and the i-th key $v_i$.

The client apparatus 2 transmits the regenerated key relationship table and data table to the server apparatus 1. The server apparatus 1 updates the key relationship table and the data table stored in the key relationship storage unit 102 and the data storage unit 101 with the key relationship table and the data table received from the client apparatus 2. The server apparatus 1 empties all elements of the key relationship array and the data array that have been stored in the key relationship storage unit 102 and the data storage unit 101. The new identifier e' generated by the data table generation unit 29 or the key relationship table generation unit 30 may be held by the client apparatus 2, or may be concealed using a method such as encryption and held by the server apparatus 1.

By generating the hash tables as described above, all data are encrypted and data is accessed by using a random index generated by a pseudo-random function. Further, each piece of data is stored at a random position using the hash tables, and the same hash table will not be referenced using the same index more than once (because data that has been referenced once before is always referenced by dummy data subsequently). Accordingly, the data, the search key, and the access pattern cannot be identified from the server apparatus 1.

Second Embodiment

The first embodiment has described the data storage system in which one server apparatus and one client apparatus are present. However, a plurality of server apparatuses may be present. The second embodiment will describe a configuration in the case where a plurality of server apparatuses are present.

The data storage system 100 of the second embodiment includes N ($\geq$2) server apparatuses $1_1, \ldots, 1_N$. In the first embodiment, the client apparatus 2 has a function of generating a hash table, whereas, in the second embodiment, each of the server apparatuses $1_n$ (n=1, . . . , N) has this function. That is to say, the server apparatus $1_n$ further includes the data table generation unit 29 and the key relationship table generation unit 30. The client apparatus 2 does not include the data table generation unit 29 and the key relationship table generation unit 30.

In the second embodiment, the data storage units 101 of the server apparatuses $1_3, \ldots, 1_N$ hold the hash tables at different levels of the data table. For example, the first server apparatus $1_1$ holds the hash tables at the first level of the data table, and the second server apparatus $1_2$ holds the hash tables at the second level of the data table. A server apparatus 1 holding the hash tables at a plurality of levels is not inhibited. For example, when two server apparatuses 1; and 12 are present, if the number of levels of the data table is four, the first server apparatus 1; may hold the hash tables at the first and third levels of the data table, and the second server apparatus $1_2$ may hold the hash tables at the second and fourth levels of the data table.

In the second embodiment, the key relationship storage units 102 of the server apparatuses $1_1, \ldots, 1_4$ hold the hash tables at different levels of the key relationship table, similarly to the data storage unit 101.

The data table generation unit 29 of the second embodiment generates a hash table at a level that is not held by the server apparatus 1 of this data table generation unit 29. Although the generation procedure is the same as that of the data table generation unit 29 of the first embodiment, the identifier e' and the index $r_1^{e'}$ of the hash tables need to be concealed from the server apparatus 1, and are therefore generated by the client apparatus 2. For example, when the first server apparatus $1_1$ holds the hash tables at the first level, and the second server apparatus $1_2$ holds the hash tables at the second level, the data transmission unit 15 of the server apparatus $1_1$ transmits, to the server apparatus $1_2$, the pair $(v_1, D)$ of the first key $v_1$ and the data D that is to be stored in a hash table at the first level. Then, the data table generation unit 29 of the server apparatus 1 generates a hash table at the first level. Similarly, the data transmission unit 15 of the server apparatus $1_2$ transmits, to the server apparatus $1_1$, the pair $(v_1, D)$ of the first key $v_1$ and the data D that is to be stored in a hash table at the second level, and the data table generation unit 29 of the server apparatus $1_2$ generates a hash table at the first level.

The key relationship table generation unit 30 of the second embodiment generates a hash table at a level that is not held by the server apparatus 1 of this key relationship table generation unit 30, similarly to the data table generation unit 29.

Third Embodiment

A hash table can be generated in two ways; namely, (1) a method in which a table creator can ascertain the relationship between an index and a data position, and (2) a method in which the table creator generates a hash table without ascertaining the relationship between an index and a data position. The method (2) requires communication between the client and the server. The method (2) is called "secret hash". A detailed configuration method of secret hash is disclosed in NPL 1, for example. In the first embodiment, the data storage system was configured based on the premise of the method (1). The third embodiment will describe a method of configuring a data storage system using (2) secret hash.

In the first embodiment, the client apparatus 2 has the function of generating a hash table, and in the second embodiment, each of the plurality of server apparatuses 1 has the function of generating a hash table. In contrast, in the third embodiment, the server apparatus 1 and the client apparatus 2 each have the function of generating a hash table, and generate a hash table by means of secret hash while communicating with each other.

When a plurality of server apparatuses $1_1, \ldots, 1_N$ are present in the data storage system 100, any server apparatus $1_n$ may hold the hash tables at a corresponding level of the data table or the key relationship table, as in the data storage system of the second embodiment. Alternatively, the hash tables at the same level may be duplicated and shared between the plurality of server apparatuses $1_1, \ldots, 1_N$.

The data table generation unit 30 of the third embodiment generates a hash table at a level that is held by the server apparatus 1 of this data table generation unit 30, while communicating with the client apparatus 2. If a hash table is duplicated and shared between the plurality of server apparatuses $1_1, \ldots, 1_N$, one server apparatuses $1_n$, of these server apparatuses $1_1, \ldots, 1_N$, may representatively generate the hash table, and duplicate and share the generated hash table with the other server apparatuses $1_{n'}$. $(n \neq n')$.

Other Variations

When the key relationship table search unit 12 and the data table search unit 14 of the server apparatus 1 reference a record in a hash table, any method may be used. For example, data may be received piece by piece using a normal communication method, or a plurality of pieces of data may be collectively received with the reference position in the hash table concealed using table reference by means of Private Information Retrieval or secret calculation.

Although the embodiments of the invention have been described thus far, it is needless to say that the specific configurations are not limited to these embodiments, and changes or the like in the design made without departing from the gist of the invention are also encompassed in the invention. Various kinds of processing described in the embodiments may not only be executed in time series in accordance with the order described, but may also be executed in parallel or individually in accordance with processing capacity of the apparatus that executes the processing, or as required.

[Program and Recording Medium]

Figure 6:
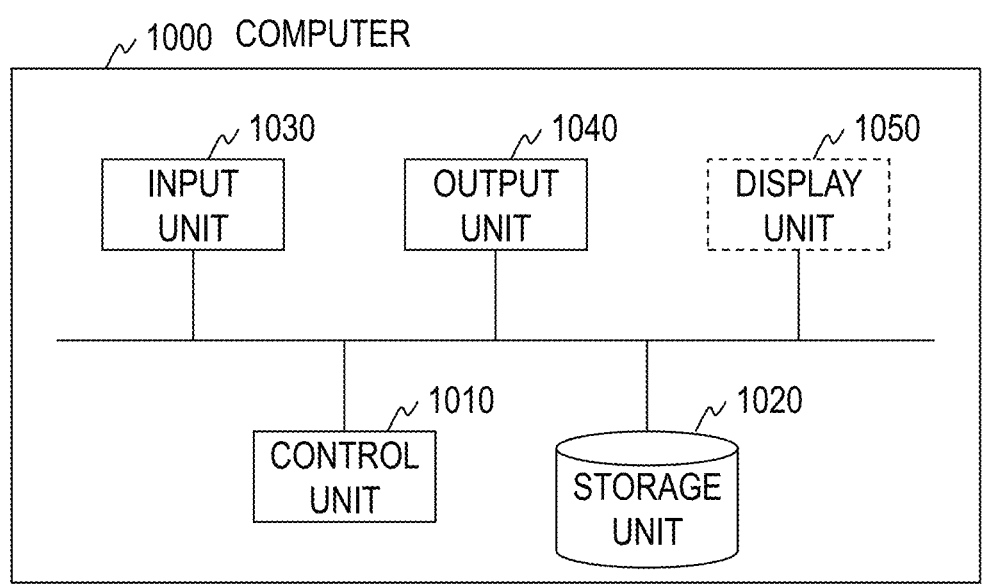
FIG. 6 is a diagram showing an example of a functional configuration of a computer.

When various processing functions of each apparatus described in the above embodiments are realized by a computer, the processing content of the functions that the apparatus should have is described by a program. Various kinds of processing functions in each of the above-described apparatuses are realized on a computer by causing a storage unit 1020 of a computer shown in FIG. 6 to load the program, and causing a control unit 1010, an input unit 1030, an output unit 1040, and so on, to operate.

The program that describes this processing content can be recorded in a computer-readable recording medium. The computer-readable recording medium may be of any kind, e.g., a magnetic recording device, an optical disk, a magneto-optical recording medium, a semiconductor memory, or the like.

This program is distributed by, for example, selling, transferring, or lending a portable recording medium, such as a DVD or a CD-ROM, in which the program is recorded. Furthermore, a configuration is also possible in which this program is stored in a storage device in a server computer, and is distributed by transferring the program from the server computer to other computers via a network.

For example, first, a computer that executes such a program stores the program recorded in the portable recording medium or the program transferred from the server computer in a storage device of this computer. When performing processing, the computer loads the program stored in its own storage device, and executes processing in accordance with the loaded program. As another mode of executing this program, the computer may directly load the program from the portable recording medium and execute processing in accordance with the program, or may sequentially execute processing in accordance with a received program every time the program is transferred to this computer from the server computer. A configuration is also possible in which the above-described processing is executed through a so-called ASP (Application Service Provider)-type service that realizes processing functions only by giving instructions to execute the program and acquiring the results, without transferring the program to the computer from the server computer. Note that the program in this mode includes information for use in processing performed by an electronic computer that is equivalent to a program (e.g., data that is not a direct command to the computer but has properties that define processing of the computer.

In this mode, the present apparatuses are configured by executing a predetermined program on a computer, but the content of this processing may be at least partially realized in a hardware manner.

The invention claimed is:

1. A cryptographic data access method to be executed by a data storage system that includes a server apparatus and a client apparatus, the server apparatus and the client apparatus each including at least a processor and a memory, and performing processing in cooperation with each other, where k and m are integers of 2 or more, and i is each of the integers that are 2 or more and m or less, a data array and a data table are stored in a data storage of the server apparatus, the data array being for storing k data elements each consisting of data and a first key associated with the data, and the data table including at least one hash table for storing k or more data records each consisting of a data index that is randomly generated based on the first key, the first key, and the data, and m−1 key relationship arrays and m−1 key relationship tables are stored in a key relationship storage of the server apparatus, each of the m−1 key relationship arrays being for storing k key relationship elements each consisting of the first key and another key associated with the data, and each of the m−1 key relationship tables including at least one hash table for storing k or more key relationship records each consisting of a key relationship index that is randomly generated based on the other key, the first key, and the other key, the data access method comprising:

generating, by a search key generation circuitry of the client apparatus, m search keys;

transmitting, by the search key generation circuitry of the client apparatus, a signal indicating a request for data access to the server apparatus;

transmitting, by a key relationship array transmission circuitry of the server apparatus, an i-th key relationship array to the client apparatus;

holding, by a key relationship array search circuitry of the client apparatus, the first key of this key relationship element as a found search key if a key relationship element that matches an i-th search key is present in the i-th key relationship array received from the server apparatus;

transmitting, by a key relationship index generation circuitry of the client apparatus, a key relationship index generated based on the i-th search key to the server apparatus;

transmitting, by a key relationship table search circuitry of the server apparatus, a key relationship record that is read out from the key relationship table using the key relationship index received from the client apparatus, to the client apparatus;

holding, by a key relationship record reference circuitry of the client apparatus, the first key of this key relationship record as the found search key if the key relationship record received from the server apparatus matches the i-th search key;

transmitting, by a key relationship array return circuitry of the client apparatus, a key relationship array in which a key relationship element consisting of the found search key and the i-th search key is set for an empty element of the i-th key relationship array, to the server apparatus;

transmitting, by a data array transmission circuitry of the server apparatus, the data array to the client apparatus;

holding, by a data array search circuitry of the client apparatus, data of this data element as found data if a data element that matches the found search key or the first search key is present in the data array received from the server apparatus;

generating, by a data index generation circuitry of the client apparatus, a data index based on the found search key if the found search key is held, or generating, by the data index generation circuitry, a data index based on the first search key if the found search key is not held, and transmitting, by a data index generation circuitry, the generated data index to the server apparatus;

identifying, by a data table search circuitry of the server apparatus, a data record using the data index received from the client apparatus, and reading out the data record;

transmitting, by the data table search circuitry of the server apparatus, the data record that is read out from the data table using the data index received from the client apparatus, to the client apparatus to allow the client apparatus to access the data record;

holding, by a data record reference circuitry of the client apparatus, data of this data record as the found data if the data record received from the server apparatus matches the found search key or the first search key; and setting, by a data array return circuitry of the client apparatus, a data element consisting of desired data and the found search key for an empty element of the data array if the found data and the found search key are held, or setting, by the data array return circuitry, a data element consisting of desired data and the first search key for an empty element of the data array if the found data and the found search key are not held, and transmitting, by the data array return circuitry, an updated data array to the server apparatus.

2. The cryptographic data access method according to claim 1, further comprising:

transmitting, by a key relationship transmission circuitry of the server apparatus, all pairs of the first key and the other key that are stored in the key relationship arrays or the key relationship tables, to the client apparatus;

transmitting, by a data transmission circuitry of the server apparatus, all pairs of the first key and the data that are stored in the data array or the data table, to the client apparatus;

generating, by a key relationship table generation circuitry of the client apparatus, an i-th key relationship table that stores key relationship records each consisting of the key relationship index generated based on the other key, the first key, and the other key, for all other keys stored in the i-th key relationship array or an i-th key relationship table; and generating, by a data table generation circuitry of the client apparatus, a data table that stores a data record consisting of a data index generated based on the first key, the first key, and the data, for all first keys stored in the data array or the data table.

3. The cryptographic data access method according to claim 2, wherein d is an integer of 2 or more, T is an integer of 1 or more, and t is each of the integers that are T or less, the data table records $kd^T$ or less data records, and has a hierarchical structure that includes d−1 hash tables for storing $kd^{t-1}$ data records at a t-th level, and the key relationship tables store $kd^T$ or less key relationship records, and each have a hierarchical structure that includes d−1 hash tables for storing $kd^{t-1}$ key relationship records at a t-th level.

4. The cryptographic data access method according to claim 3, wherein the data storage system includes a plurality of the server apparatuses, the data storage of each of the server apparatuses stores a hash table at a predetermined level of the data table, the hash table being at a level that is not stored by another server apparatus, and the key relationship storage of each of the server apparatuses stores a hash table at a predetermined level of the i-th key relationship table, the hash table being at a level that is not stored by another server apparatus.

5. A cryptographic data storage system that includes a server apparatus and a client apparatus, the server apparatus and the client apparatus each including at least a processor and a memory, and performing processing in cooperation with each other, where k and m are integers of 2 or more, and i is each of the integers that are 2 or more and m or less, the server apparatus comprising:

a data storage configured to store a data array and a data table, the data array being for storing k data elements each consisting of data and a first key associated with the data, and the data table including at least one hash table for storing k or more data records each consisting of a data index that is randomly generated based on the first key, the first key, and the data;

a key relationship storage configured to store m−1 key relationship arrays and m−1 key relationship tables, each of the m−1 key relationship arrays being for storing k key relationship elements each consisting of the first key and another key associated with the data, and each of the m−1 key relationship tables including at least one hash table for storing k or more key relationship records each consisting of a key relationship index that is randomly generated based on the other key, the first key, and the other key;

a key relationship array transmission circuitry configured to transmit an i-th key relationship array to the client apparatus;

a key relationship table search circuitry configured to transmit a key relationship record that is read out from the key relationship table using a key relationship index received from the client apparatus, to the client apparatus;

a data array transmission circuitry configured to transmit the data array to the client apparatus; and a data table search circuitry configured to identify and transmit a data record that is read out from the data table using a data index received from the client apparatus, to the client apparatus to allow the client apparatus to access the data record, and the client apparatus comprising:

a search key generation circuitry configured to generate m search keys, the search key generation circuitry being further configured to transmit a signal indicating a request for data access to the server apparatus;

a key relationship array search circuitry configured to hold the first key of this key relationship element as a found search key if a key relationship element that matches an i-th search key is present in the i-th key relationship array received from the server apparatus;

a key relationship index generation circuitry configured to transmit a key relationship index generated based on an i-th search key to the server apparatus;

a key relationship record reference circuitry configured to hold the first key of this key relationship record as the found search key if the key relationship record received from the server apparatus matches the i-th search key;

a key relationship array return circuitry configured to transmit a key relationship array in which a key relationship element consisting of the found search key and the i-th search key is set for an empty element of the i-th key relationship array, to the server apparatus;

a data array search circuitry configured to hold data of this data element as found data if a data element that matches the found search key or the first search key is present in the data array received from the server apparatus;

a data index generation circuitry configured to generate a data index based on the found search key if the found search key is held, or generate a data index based on the first search key if the found search key is not held, and transmit the generated data index to the server apparatus;

a data record reference circuitry configured to hold data of this data record as the found data if the data record received from the server apparatus matches the found search key or the first search key; and a data array return circuitry configured to set a data element consisting of desired data and the found search key for an empty element of the data array if the found data and the found search key are held, or set a data element consisting of desired data and the first search key for an empty element of the data array if the found data and the found search key are not held, and transmit an updated data array to the server apparatus.

6. The cryptographic data access storage system according to claim 5, wherein the server apparatus and the client apparatus are connected by a network.

7. The cryptographic data access storage system according to claim 6, wherein the network is a packet-switched network or a line-switched network.

8. The cryptographic data access storage system according to claim 6, wherein the network includes a local area network (LAN), a wide area network (WAN), or the Internet.

9. The cryptographic data access storage system according to claim 5, wherein the client apparatus is a smartphone.

10. A cryptographic server apparatus,
where k and m are integers of 2 or more, and i is each of the integers that are 2 or more and m or less, the server apparatus performing processing in cooperation with a client apparatus,
the apparatus comprising a processor, a memory, and:
- a data storage configured to store a data array and a data table, the data array being for storing k data elements each consisting of data and a first key associated with the data, and the data table including at least one hash table for storing k or more data records each consisting of a data index that is randomly generated based on the first key, the first key, and the data;
- a key relationship storage configured to store m−1 key relationship arrays and m−1 key relationship tables, each of the m−1 key relationship arrays being for storing k key relationship elements each consisting of the first key and another key associated with the data, and each of the m−1 key relationship tables including at least one hash table for storing k or more key relationship records each consisting of a key relationship index that is randomly generated based on the other key, the first key, and the other key;
- a key relationship array transmission circuitry configured to transmit an i-th key relationship array to the client apparatus in response to receipt of a signal indicating a request for data access from the client apparatus;
- a key relationship table search circuitry configured to transmit a key relationship record that is read out from the key relationship table using a key relationship index received from the client apparatus, to the client apparatus;
- a data array transmission circuitry configured to transmit the data array to the client apparatus; and
- a data table search circuitry configured to identify and transmit a data record that is read out from the data table using a data index received from the client apparatus, to the client apparatus to allow the client apparatus to access the data record.

11. A non-transitory computer-readable recording medium on which a program for causing a computer to operate as the server apparatus according to claim 10 is recorded.

12. A cryptographic client apparatus,
where k and m are integers of 2 or more, and i is each of the integers that are 2 or more and m or less, the client apparatus performing processing in cooperation with a server apparatus,
the apparatus comprising a processor, a memory, and:
- a search key generation circuitry configured to generate m search keys the search key generation circuitry being further configured to transmit a signal indicating a request for data access to the server apparatus;
- a key relationship array search circuitry configured to hold the first key of a key relationship element as a found search key if the key relationship element that matches an i-th search key is present in the i-th key relationship array received from the server apparatus;
- a key relationship index generation circuitry configured to transmit a key relationship index generated based on an i-th search key to the server apparatus;
- a key relationship record reference circuitry configured to hold the first key of the key relationship record as the found search key if the key relationship record received from the server apparatus matches the i-th search key;
- a key relationship array return circuitry configured to transmit a key relationship array in which a key relationship element consisting of the found search key and the i-th search key is set for an empty element of the i-th key relationship array, to the server apparatus;
- a data array search circuitry configured to hold data of a data element as found data if the data element that matches the found search key is present in a data array received from the server apparatus to allow the client apparatus access to the data element;
- a data index generation circuitry configured to transmit a data index generated based on a first search key to the server apparatus;
- a data record reference circuitry configured to hold data of this data record as the found data if the data record received from the server apparatus matches the found search key or the first search key; and
- a data array return circuitry configured to set a data element consisting of desired data and the found search key for an empty element of the data array if the found data and the found search key are held, or set a data element consisting of desired data and the first search key for an empty element of the data array if the found data and the found search key are not held, and transmit an updated data array to the server apparatus.

13. A non-transitory computer-readable recording medium on which a program for causing a computer to operate as the client apparatus according to claim 12 is recorded.

* * * * *

UNITED STATES PATENT AND TRADEMARK OFFICE
CERTIFICATE OF CORRECTION

PATENT NO. : 12,255,993 B2
APPLICATION NO. : 17/642703
DATED : March 18, 2025
INVENTOR(S) : Atsunori Ichikawa et al.

Page 1 of 1

It is certified that error appears in the above-identified patent and that said Letters Patent is hereby corrected as shown below:

In the Claims

Column 13, Line 20, "and tis each of the integers" should read --and t is each of the integers--.

Signed and Sealed this
Twenty-seventh Day of May, 2025

Coke Morgan Stewart
*Acting Director of the United States Patent and Trademark Office*